(12) United States Patent
Davis

(10) Patent No.: US 6,362,745 B1
(45) Date of Patent: Mar. 26, 2002

(54) METHOD OF DETECTING TAMPER OF AN ELECTRIC METER

(75) Inventor: Glenn A. Davis, Lilburn, GA (US)

(73) Assignee: Comverge Technologies, Inc., Florham Park, NJ (US)

( * ) Notice: Subject to any disclaimer, the term of this patent is extended or adjusted under 35 U.S.C. 154(b) by 0 days.

(21) Appl. No.: 09/568,699

(22) Filed: May 11, 2000

Related U.S. Application Data

(60) Division of application No. 08/838,307, filed on Apr. 15, 1997, now Pat. No. 6,118,269, which is a continuation-in-part of application No. 08/824,433, filed on Mar. 26, 1997, now Pat. No. 5,898,387.

(51) Int. Cl.$^7$ .............................................. G08B 21/00
(52) U.S. Cl. ................. 340/637; 340/870.02; 340/3.34; 324/110
(58) Field of Search ........................... 340/637, 870.02, 340/3.34; 324/110

(56) References Cited

U.S. PATENT DOCUMENTS

| | | | | |
|---|---|---|---|---|
| 4,357,601 A | * | 11/1982 | McWilliams | 340/506 |
| 5,056,107 A | * | 10/1991 | Johnson et al. | 340/637 |
| 5,293,115 A | | 3/1994 | Swanson | 324/110 |
| 5,422,565 A | * | 6/1995 | Swanson | 324/110 |
| 5,488,565 A | | 1/1996 | Kennon | 324/110 |
| 5,586,130 A | | 12/1996 | Doyle | 324/110 |
| 5,750,983 A | | 5/1998 | Swanson | 324/110 |
| 6,118,269 A | * | 9/2000 | Davis | 324/110 |

* cited by examiner

Primary Examiner—Donnie L. Crosland
(74) Attorney, Agent, or Firm—Renner, Otto, Boisselle & Sklar, LLP

(57) ABSTRACT

An electric meter tamper detection system for sensing removal of an electric meter from a corresponding meter socket and for generating a tamper signal is disclosed. In this system, the tamper signal is relayed to a headend when the electric meter—connected in series with and monitoring current flour through at least one conductor—has been removed from the meter socket. At least one resistor is electrically connected to the line-side of the conductor. A light emitting diode is electrically coupled to the resistor and to the load-side of the conductor. A transistor receives the tamper signal from the light emitting diode when the electric meter is removed from the meter socket. A microprocessor is coupled to the transistor, receives the tamper signal from the transistor, and relays the tamper signal to said headend. Thus, the headend is immediately notified if and when the electric meter is removed from its meter socket. A modular meter based utility gateway enclosure which resides between a power meter and a meter socket of a residence or other building supports multiple interchangeable local area network (LAN) and wide area network (WAN) interface cards is also disclosed.

13 Claims, 8 Drawing Sheets

METHOD OF DETECTING TAMPER OF AN ELECTRIC METER

PRIORITY CLAIM

The present application is a divisional of U.S. patent application Ser. No. 08/838,307 filed Apr. 15, 1997, U.S. Pat. No. 6,118,269 entitled Electronic Meter Tamper Detection Circuit For Sensing Electric Meter Removal", which is a continuation-in-part of U.S. patent application Ser. No. 08/824,433, entitled "Modular Meter Based Utility Gateway Enclosure," filed Mar. 26, 1997, now U.S. Pat. No. 5,898,387, issued Apr. 27, 1999, by Glenn Davis and David Walz, the disclosure of which is incorporated herein by reference.

FIELD OF THE INVENTION

In general, the present invention relates to utility metering systems and, more particularly, to a tamper detection circuit for sensing removal of an electric meter from a corresponding meter socket at a utility entrance of a residence or other building. The present invention also relates to a modular meter based utility gateway enclosure installed between an electric meter and a corresponding meter socket of a residence or other building, wherein the utility gateway enclosure simultaneously supports multiple interchangeable wide area network (WAN) and local area network (LAN) interface cards.

BACKGROUND OF THE INVENTION

Utility meters are used for billing services provided by public utilities such as power, gas and water. For example, kilowatt-hour meters, located on customer premises, include detachable meter units for measuring and recording electric power consumption by the customer. Typically, an induction-type kilowatt-hour meter is provided at each customer location. The induction type kilowatt-hour meter operates on the same principle as that of a rotating magnetic field in an squirrel-cage induction-type motor. Electric power service is routed through the meter in a manner causing a metallic disk to revolve at a rate proportional to power consumption. Disk rotation is counted and recorded mechanically using a mechanical kilowatt-hour register and/or electronically with data stored in a conventional semi-conductor memory. Meter reading personnel periodically inspect each customer site and record utility meter readings, either by hand or using an electronic probe to retrieve data stored in solid state memory. Billing information is generated based on the data collected by the meter reading personnel.

To increase data collection efficiency and reliability, utility meters are now available which include interface equipment to permit remote interrogation of the meter and transmission of usage data. Connectivity between utility meters located at remote customer sites and a central billing facility can be provided using various media including signals transmitted on power lines, dedicated signaling lines, the public telephone switched network (PTSN) and radio frequency (RF) transmissions.

As a result of increased utilization of automatic remote reading of utility meters, there has been a decreased frequency of on-site inspection of metering equipment, providing an increased opportunity for undetected tampering with the metering equipment For example, most single phase and polyphase electricity meters in the United States are socket mounted. Most common methods of tampering with such electricity metering installation involves removing the meter from the meter socket. Once removed, a single phase meter, for example, can be reinstalled upside down resulting in reverse rotation of the internal meter disk and register dials which record cumulative energy consumption.

Earlier generations of conventional induction type kilowatt-hour meters employed a mechanical technique to sense the installation of a meter and a counter sealed beneath the meter cover to record and display the number of times the meter had been removed and reinstalled. Later generations of induction meters employed orientation sensitive switches (tilt switches) and logic elements to sense common tampering techniques.

Although tilt switches have proven effective at sensing removal and reinstallation of meters when reinstalled upside down, these techniques are not able to reliably sense meter removal from a socket when a reasonable attempt is made to maintain the meters in a normal attitude. If the tilt switch is made overly sensitive, then the system will falsely report tampering in response to normal events such as a branch blowing against the meter or other foreign object inadvertently striking the meter or supporting structures. Conversely, if the tilt switch is insufficiently sensitive, then a person observing reasonable precautions can remove the meter from its socket without activating the tamper detection system.

Another prior art tamper detection system is U.S. Pat. No. 5,331,412 to Farmer, et al. which issued Jul. 19, 1994. Farmer discloses a circuit which monitors certain signals coming from a single dwelling interdiction unit, and if the signals are interrupted, removes service from the premises. In order for service to reinstituted to the subscriber, DC power from the single dwelling interdiction unit should be communicated to a tap microprocessor.

SUMMARY OF THE INVENTION

In view of the foregoing limitations and disadvantages of the prior art, it is therefore an object of the present invention to provide an improved system capable of detecting electrical meter tampering which will eliminate false tamper alerts.

Another object of the present invention is to provide a system capable of notifying a remote headend if and when an electrical meter has been removed.

To achieve these objects, an electric meter tamper detection-system for sensing removal of an electric meter from a corresponding meter socket is provided. In this system, a tamper signal is relayed to a headend when the electric meter—connected in-line with and monitoring current flow through at least one conductor—has been removed from the meter socket. The tamper signal can be any electromagnetic indicator, such as the presence or absence of a specific voltage level, and can be transmitted in whole or in part over telephone lines, power lines, or a radio frequency circuit. The system includes at least one resistor is electrically connected to the line-side of the conductor. A light emitting diode is electrically coupled to the resistor and to the load-side of the conductor. A transistor receives the tamper signal from the light emitting diode when the electric meter is removed from the meter socket. A microprocessor is coupled to the transistor, receives the tamper signal from the transistor, and relays the tamper signal to said headend. Thus, the headend is immediately notified if and when the electric meter is removed from its meter socket.

In the preferred embodiment, the components of an electric meter tamper detection circuit are interconnected in the following configuration. A first resistor is electrically connected to the line-side of a first power conductor and to the load-side of a second power conductor. A second resistor is electrically coupled to the line-side of the second power conductor. A first light emitting diode is coupled to the second resistor and to the load-side of the second power conductor. A second light emitting diode is electrically coupled in parallel with said first light emitting diode. A n-p-n transistor with a collector, an emitter and a base is also included. The emitter of the transistor receives the tamper signal from the first and second light emitting diodes when the electric meter is removed from said meter socket. A microprocessor receives the tamper signal from the collector of the n-p-n transistor and relays the tamper signal to the headend. In this embodiment, the diodes and the transistor are provided in a standard dual diode optical isolator.

These as well as other novel advantages, details, embodiments, features and objects of the present invention will be apparent to those skilled in the art from the following detailed description of the invention, the attached claims and accompanying drawings, listed hereinbelow, which are useful in explaining the invention.

BRIEF DESCRIPTION OF THE DRAWINGS

In the text which follows and in the drawings, wherein similar reference numerals denote similar elements throughout the several views thereof, the present invention is explained with reference to illustrative embodiments, in which.

DETAILED DESCRIPTION OF INVENTION

For a better understanding of the present invention, reference may be had to the following detailed description taken in conjunction with the appended claims and accompanying drawings. In essence, the present invention is based on the concept of sensing removal of an electric meter from, a corresponding meter socket, and relaying a tamper signal to a headend if and when the electric meter has been removed from the meter socket.

Figure 1:
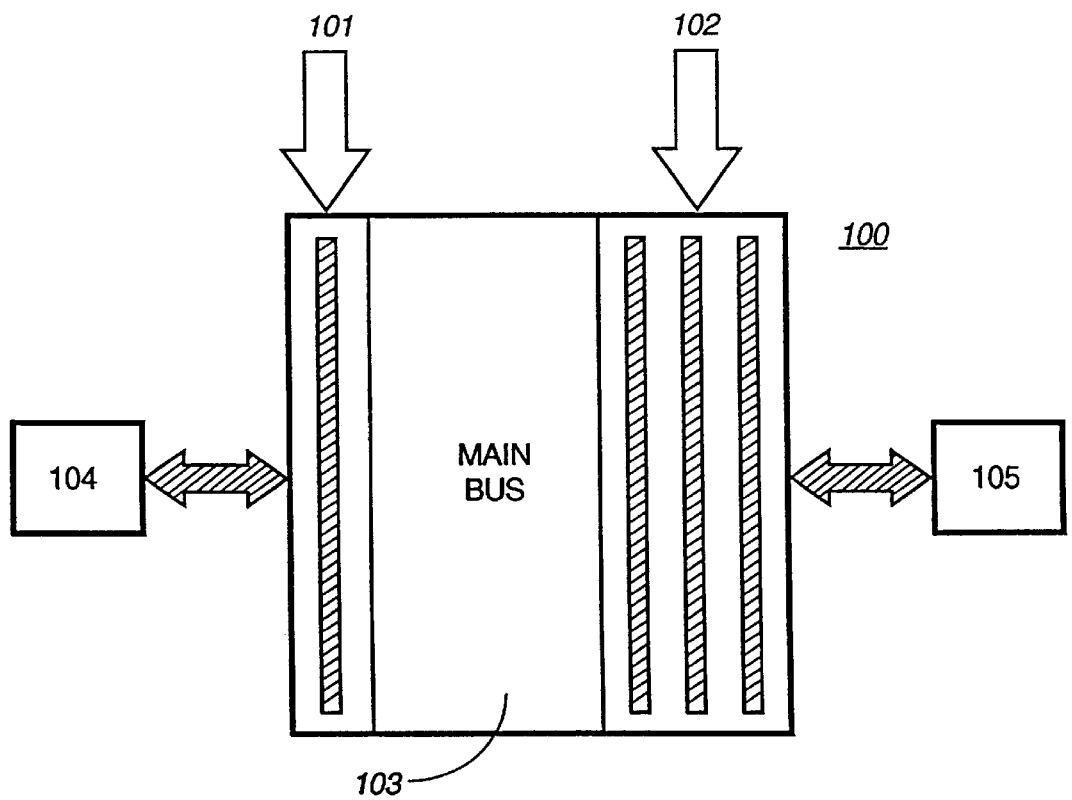
FIG. 1 depicts a block diagram of the components of a modular meter based utility gateway according to the present invention.

With reference to FIG. 1, a modular meter based, utility gateway 100 according to the present invention includes a wide area network (WAN) interface card 101, three local area network (LAN) or in-home network interface cards 102, and a main bus 103. The WAN interface card 101 receives information from and transmits information to a remote headend 104. The LAN/in-home network interface cards 102 transmits information to and receives information from a subscriber terminal 105. Information is transmitted between the WAN card 101 and LAN/in-home cards 102 by main bus 103.

The headend 104 which communicates with the WAN card 101 configures the downstream flow of data over the network to a plurality of subscriber sites, each having a modular meter-based utility gateway enclosure according to the present invention. The headend 104 may be, for example, a resident database containing control algorithms to route and store data for the applications of each subscriber terminal 105. In functioning as a database, the headend 104 contains subscriber records and data in its files and provides other applications with data on request. In an exemplary embodiment of the present invention, the headend 104 can accommodate 65,000 sites in broadband.

The system supports multiple WAN forms including, but not limited to, coaxial, fiber and hybrid fiber coaxial (HFC) broadband, RF, telephony, and satellite (e.g., low-earth orbit (LEO) and little LEO (LLEO)).

According to an HFC broadband embodiment of the present invention, when a data packet is to be sent by broadband, the headend 104 encapsulates the data packet with header information and CRC error detection bits and then places the data packet into a network TDMA scheme using time slots for communication. The packets are then sent by the headend 104 to the utility gateway 100 and received by the WAN card 101. The WAN architecture may be designed to support asynchronous transfer mode (ATM) transport with UDP/IP (user datagrain protocol/Internet protocol) type addressing on the cable system. TDMA addressing is preferred. The TDMA transport is used primarily, on a dynamically allocated basis, for routing message traffic and for file transport facilities.

The data packet is then transmitted from the headend 104 to the utility gateway 100 via a hybrid fiber-optic coaxial (HFC) network. The HFC network may be a utility non-application specific, meaning no special modifications are required to provide utility applications. This is a feature common to the WANs utilized. The typical architecture of an HFC network includes a number of fiber nodes that receive and convert optical signals to electrical signals, and drive two-way signals onto the coaxial plant. In an illustrative embodiment, a fiber node can serve between 500 and 2000 homes. From the node, a coaxial distribution network carries signals to subscribers' homes. Along the distribution network, the utility gateways 100 are connected to provide the final link to the utility application in-home. According to this exemplary embodiment, data may be transported at 125 kbps using FSK modulation. This approach permits apparent asynchronous communication, file transfer activities, Internet access and other modem functions, and shareable channel with other services in TDMA. In another broadband embodiment, data may be transported at T1 speed with a 1 MHZ bandwidth in the forward and reverse directions (1.5 Mbps). QPSK modulation may be used for robust data communications and high bandwidth efficiency.

Other WANs can be used in the gateway of FIG. 1. For example, when the data packet is sent by radio frequency (RF) such as at very high frequency (VHF) or via telephony, a VHF/telephony media access controller (VTMAC) receives and transmits the data packet. Thereafter, if the data packet contains an unscheduled message, it is distributed by RF and sent to a radio tower which broadcasts the information-over the RF network to gateway 100. Otherwise, the data packet is put onto the telephone network phone lines and sent to the utility gateway 100. According to this exemplary configuration, the VTMAC can control data transport so that unscheduled messages can be transported via the RF network while scheduled transactions and gateway return communications can be transported via the telephone network.

If the data packet is to be distributed via satellite, a little LEO (LLEO) media access controller (LLMAC) receives and communicates the data packet over the phone lines to a LLEO service provider that broadcasts the information over a satellite network to the utility gateway 100. This functionality is described in U.S. patent application Ser. No. 08/604,784, filed Feb. 23, 1996 and entitled "Method and Apparatus for Command and Control of Remote Systems Using Low Orbit Satellite Communications," which is incorporated herein by reference.

In the exemplary broadband implementation of the gateway 100 described above, the WAN card 101 may include an FSK transceiver if the modulation technique at the headend is FSK. Also, the WAN card 101 provides control for the TDMA transport scheme using a microprocessor. The microprocessor can receive messages, check CRC and address information, perform TDMA decoding, clocking, bus interface and memory management. The microprocessor also manages the TDMA transmitter in response to the embedded clock signals in the downstream data packets. The microprocessor may be an 80C51XA made by Philips Electronics or in the Motorola 68000 family with internal ROM, RAM and EEROM.

According to another exemplary broadband implementation of the gateway 100, the WAN card 101 may include a QPSK transceiver if the headend uses QPSK modulation. Some of the functions which may be embedded in this illustrative WAN interface include ATM filtering, IP filtering, IDMA control, CRC calculator, 68000 type or 80C51XA. microcontroller, and bus controller and LAN interface drivers. External ROM may be used to support program control of the WAN communications interface. An external RAM can provide temporary storage of data. An external EEROM may be provided for permanent storage for media access control (MAC) address and other permanent or semi-permanent data. The microcontroller manages slotted Aloha transmission and the TDMA transport scheme.

The WAN card 101 demodulates the data packet and removes the header including routing and control information from the packet put on by the MAC. The WAN card 101 sends the data over main bus 103 to an appropriate LAN interface 102 which translates and removes the protocol and recovers the native message when the gateway 100 is instructed to listen and pass the native message to the in-home device 105. The protocol removed includes PTID, PID, GPPD, and SessionID.

In the illustrative embodiment of FIG. 1, three LAN interface cards are provided. However, any number of LAN interfaces may be provided. As a result of the multiple LAN card slots provided by the enclosure according to the present invention, when a new application is implemented by a subscriber, the LAN interface corresponding to the new application is simply inserted into the enclosure. Since the LAN interfaces can be plug-in cards, replacement and addition of LAN interfaces is relatively easy. Exemplary LAN interfaces may include a LonWorks™ interface, CEBus™ interface, hardwired interface, RF interface, an RS-232 interface, or a broadband modem. LonWorks™ and CEBus™ are specific protocol designed for power line carrier communications.

The LonWorks™ interface is designed to provide Echelon power line carrier communications for the home LAN. The interface includes a microprocessor which is responsible for bus interface and protocol translations. The microprocessor may be a Neuron chip by Motorola. The Neuron chip receives standard LonWorks™ protocol to be inserted on the power lines. The data is routed to an Echelon PLT 21 communications device and inserted on the power wiring through a coupling network and external wiring. The Neuron chip handles data transport issues including collisions and delivers the requested data to the microprocessor when available. The microprocessor then presents data to the WAN card 101 via the main bus 103 for communications to the MAC or other application as directed by routing (mapping) tables in the WAN card 101. In some instances, gateway 100 may have intelligence such as in a narrowband implementation or in broadband if intelligent gateway and be able to directly rout information elsewhere, for example to a nearby load control device.

The CEBus™ interface provides CEBus™ power line carrier communications for the home LAN. The microprocessor may be in the 68000 family or a Philips 80C51XA and interface with a CEBus™ communications device which inserts the data on the power wiring through a coupling network and external wiring. The microprocessor handles data transport issues including collisions and delivers the requested data to the WAN card 101 via the common bus 103 for communications to the MAC or other application as directed by routing (mapping) tables in the WAN interface card 101.

The hardwired interface is provided for applications such as low cost scenarios. This interface provides for a pulse initiator and maintains an accumulator function with an EEROM type memory and long term battery support. The interface takes input from devices such as electric, gas, and water meters.

The RF interface provides wireless communications for devices in and around the home such as electric, gas, and water meters, and appliances.

An RS-232 interface can support services such as local narrowband nodes. The RS-232 interface may extract data files from a local host system on command. This permits the transfer of large data files.

A broadband modem may share the utility data communications channel for the purpose of Internet access and other computer type services. Rapid access to file servers providing access to a variety of services can be realized.

A native message is transmitted upstream from the in-home device 105 to the applications platforms over the same mediums. The in-home device 105 passes the native message to its corresponding LAN interface card (one of LAN cards 102). The LAN interface adds the protocol to the native message and passes the data packet with the protocol and native message to the WAN interface card 101 via the bus 103. The WAN interface card 101 encapsulates the data packet by adding a header and transmits the information upstream from the gateway 100 over the appropriate WAN to the headend. For example, the gateway 100 can transmit the information over the HFC network to the headend 104 at a rate to 125 kbps. At the headend, the demodulator portion of broadband modem 30 demodulates the upstream data packet from a 125 kbps FSK modulated NRZ signal to a 115.2 kbps baseband NRZ signal.

Additional details concerning the operation of the headend and the formatting of information transmitted between the headend 104 and the gateway 100 are provided in co-pending U.S. patent application Ser. No. 08/751,946, entitled "Method and Apparatus for Communicating Information Between a Headend and Subscriber over a Wide Area Network," filed on Nov. 19, 1996, and incorporated herein by reference.

In an alternative embodiment, the meter-based utility gateway enclosure according to the present invention may also be configured to receive one or more interdiction cards in addition to or in place of one or more of the LAN and WAN cards within the enclosure. These interdiction cards are custom-designed to operate with the WAN/LAN protocols and main bus protocols (described in detail below) of the gateway and enable the jamming of unauthorized user services.

The main bus 103 transmits data and control information between the WAN card 101 and the LAN cards 102. The main bus 103 may be a backplane bus which supports a data transfer rate of up to 20,000 bps and provides flow control in both directions using a small number of microprocessor I/O pins.

According to one embodiment of the present invention, the WAN card 101 acts as the bus master and the LAN cards are the bus slaves. Each gateway 100 has one master slot and up to three slave slots. The master coordinates use of the bus and participates in packet transfers. In order for one slave to send a packet to another slave, the master should perform a relay function.

The basic bus transaction is a packet transfer from master to slave, slave to master, or both. The master initiates bus transactions, and therefore should continuously poll the slaves to provide the opportunity for the slaves to transfer packets to the master. During periods when there is no data transfer between the master and slaves, bus transactions end quickly without any packet transfer taking place.

Bus signals are pulled up to +5V by 10K pullup resistors on the backplane card. Examples of lines that are driven by the master may be card select (CS), data input (DIN), clock (CLK), and reset (RST). Examples of lines driven by the slaves are data output (DOUT) and handshake (HS).

Regarding the card selection (CS) operation, there is a dedicated CS line for each slave slot. All three lines converge on the master slot, whereas each slave sees only a single CS line which is dependent upon the slot the slave card occupies. The purpose of the CS line is to select one slave for a bus transaction. The master holds the CS line to the selected slave for the duration of the transaction.

The data input (DIN) signal carries data from the master to the currently selected slave.

The data output (DOUT) signals carries data from the currently selected slave to the master.

The clock (CLK) signal is driven by the master. The master toggles CLK to indicate that it has made the next bit available on DIN or accepted the current bit on DOUT.

The handshake (HS) signal is driven by the currently selected slave. The slave toggles HS to indicate that it has accepted the current bit on DIN or made the next bit available on DOUT.

The reset (RST) signal is driven by the master and provides an active-low hardware reset signal to the slaves.

Byte transfers across the main bus 103 between the master WAN interface card 101 and the slave LAN interface cards 102 will now be described in detail. A bus transaction consists of many individual byte transfers in both directions (master to slave and slave to master). Bytes are sent across the serial-bus most-significant bit first. In one exemplary configuration, bit 7 is selected as the most significant bit and bit 0 is selected as the least significant bit.

In master to slave transfers, both CLK and HS are initially high. The master puts bit 7 on DIN and lowers CLK. The slave reads the DIN bit (bit 7) and lowers HS. The master puts bit 6 on DIN and raises CLK. The slave reads bit 6 and raises HS. This process repeats until the eight bits have been transferred from the master to the slave.

In slave to master transfers, both CLK and HS are initially high. The slave puts bit 7 on DOUT and lowers HS. The master reads the DOUT bit (bit 7) and lowers CLK. The slave puts bit 6 on DOUT and raises HS. The master reads bit 6 and raises CLK. This process repeats until the eight bits have been transferred from the slave to the master.

During byte transfers, each time the master toggles CLK, it waits up to 100 μs for the slave to respond by toggling HS. If the slave does not respond in that period of time, the master resynchronizes the bus 103 as described below. By contrast, the slaves do not have such timeouts and wait indefinitely for the master to toggle CLK or to resynchronize the bus 103.

The master (WAN card 101, e.g.) can resynchronize the bus 103 (return it to its initial state) by bringing the CS lines high for 200 μs or longer. The slaves recognize the loss of CS within 200 μs, terminate any bus transactions in progress, cease driving any output lines (DOUT and/or HS), and reset their bus interfaces to the initial state. The initial state is the idle state between bus transactions (no transaction in progress). To enable the bus to be resynchronized in this fashion, the slaves check the state of their respective CS line at least once every 100 μs.

If bus resynchronization fails (for example, if DOUT and/or HS do not return to a high level within the 200 μs), the master can reset the slave boards by driving RST low for 100 μs or longer. A reset pulse of 100 μs shall be sufficient to cause a hardware reset of the slaves.

The master detects the presence of slaves (LAN cards 102) within the slave slots through a polling function. The master initially assumes that the slots are full and polls the slots. If no slave answers the poll in a specific slot, the transaction will time out. Three consecutive timeouts will remove the slave slot from the master's normal polling sequence. At least once every 10 seconds, the master re-polls the slaves which have been removed from the polling sequence and adds slaves which respond to the poll back into its normal polling sequence.

The bus protocol will now be described in detail. The transactions start with the master selecting a slave by lowering the respective CS line and holding it low for the entire duration of the transaction. The master may abort the transaction at any time by raising the CS line, after which it should hold the CS lines high for 200 μs before starting another transaction.

After lowering the CS line, the master sends a control byte to the selected slave in the following format including MEXT (master control byte extension), MDA (master data available), and MRR (master ready to receive) bits:

| bit 7 | bit 6 | bit 5 | bit 4 | bit 3 | bit 2 | bit 1 | bit 0 |
|---|---|---|---|---|---|---|---|
| MEXT | unused | unused | unused | unused | unused | MDA | MRR |

MDA=1 indicates that the master wants to send a data packet to the slave. MRR=1 indicates that the master is prepared to receive a data packet from the slave. MEXT=1 indicates that additional control bytes are to follow, as described in more detail below. The master sets the unused bits to 0, and the slave ignores them.

If the MEXT bit is set in the control byte, the master sends one or more additional control bytes including MARG (master command argument present) and MCMD (master command code) bits in the following format:

| bit 7 | bit 6 | bit 5 | bit 4 | bit 3 | bit 2 | bit 1 | bit 0 |
|---|---|---|---|---|---|---|---|
| MARG | MCMD | — | — | — | — | — | — |

MARG=1 indicates that additional argument bytes are to follow. The first such byte, MLEN, indicates the number of additional byte arguments. This number does not include the MLEN byte itself. If the slave does not recognize the command code sent by the master, it can still parse the byte stream and skip over any byte arguments.

The lower seven bits of this byte form a command code which allows for primitive communication between the master and slaves even if normal byte transfer is not possible for some reason. An exemplary set of command codes is provided below.

Master Command Codes:
1) Peripheral Identification (PID) Request:
   Command code: 00 hex
   Arguments: none
   This command asks the slave to send its list back to the master.
2) Priority Message Pending:
   Command code: 01 hex
   Arguments: none
   This command indicates that a priority message is pending in the master-to-slave direction. This command is issued only if delivery of the priority message was blocked on some number of previous attempts due to SRR=0. On receipt of this command, the slave takes action to clear its buffers to facilitate delivery of the message.

Upon receipt of a master control byte, the recipient slave generates and sends back a similar control byte including SEXT (slave control byte extension), SRR (slave ready to receive), and SDA (slave data available) bits in the following format:

| bit 7 | bit 6 | bit 5 | bit 4 | bit 3 | bit 2 | bit 1 | bit 0 |
|---|---|---|---|---|---|---|---|
| SEXT | unused | unused | unused | unused | unused | SDA | SRR |

SDA=1 indicates that the slave wants to send a package to the master. SRR=1 indicates that the slave is prepared to receive a data packet from the master. SEXT=1 indicates that additional control bytes are to follow, as described below. The slave sets the unused bits to 0, and the master ignores them.

If the SEXT bit is set in the slave control byte, the slave then sends one or more additional control bytes including SARG (slave command argument present) and SRPS (slave response code) in the following format:

| bit 7 | bit 6 | bit 5 | bit 4 | bit 3 | bit 2 | bit 1 | bit 0 |
|---|---|---|---|---|---|---|---|
| SARG | SRPS | — | — | — | — | — | — |

SARG=1 indicates that additional argument bytes are to follow. The first such byte, SLEN, indicates the number of additional argument bytes, excluding the SLEN byte itself.

Exemplary slave command codes include:
1) PID Response
   Command code: 00 hex
   Arguments: list
   This response code is sent in response to a request by the master. The list for the slave is sent in the byte arguments. As for any command or response with arguments, the first argument byte is a count of the number of additional argument bytes (in this case, codes) to follow.
2) Priority Message Pending
   Command code: 01 hex
   Arguments: none
   This command indicates that a priority message is pending in the slave-to-master direction. This command is issued only if delivery of the priority message was blocked on some number of previous attempts due to MRR=0. On receipt of this command, the master takes action to clear its buffers to facilitate delivery of the message.
3) Command Error
   Command code: 02 hex
   Arguments: none
   The slave issues this command code when it receives a command code from the master that it does not recognize. There is no equivalent code in the master-slave direction, as the master ignores commands it does not recognize.

Once the master and slave have exchanged control bytes as described above, both sides perform the following negotiation algorithm to determine what packet transfer(s) will take place:

If MDA=1 and SRR=1. then a packet shall be transferred from the master to the slave.

If SDA=1 and MRR=1. then a packet shall be transferred from the slave to the master.

The algorithm is implemented by ANDing the two control bytes together. Once the negotiation is completed, either the master or the slave commences packet transfer to the other.

The packet format consists of a fixed-size header containing a length byte followed by a variable-sized data block. The data block can be up to 64 bytes in length.

At the end of each bus transaction, the master sends an end of transmission (EOT) byte to the slave. The EOT byte is, for example, a hex 55 command code (chosen so that DIN will end up high). The master then raises CS, ensures that DOUT and HS are high, and selects another slave for the next transaction. Alteratively, the master may commence another transaction with the same slave by leaving CS low and sending the control byte for the next transaction.

If a slave becomes busy for an extended period of time and does not service its bus interface, bus transfers to other slaves may be blocked. To avoid this situation, the slave is designed to always service its bus interface at a minimal level sufficient to respond to the polls, even if it is unable to continue with packet transfers. However, in some cases this is not possible.

Therefore, to avoid the blocking of bus transfers to other slaves, a slave may indicate a busy status to the master which prevents the master from attempting transactions with the busy slave. This may be accomplished by bringing DOUT low within 1 µs after the slave's CS line goes low. Thus, after a master selects a slave by bringing the CS line to the slave to a low state, it delays for 1 µs and then checks DOUT. If DOUT is high, it commences the bus transfer to the slave. If DOUT is low, the master deselects the slave, waits for DOUT to return to a high level, and selects another slave.

To implement this feature whereby DOUT is set to a low state by the slave, an external DOUT driver is provided, thus enabling the slave's microprocessor to set DOUT at a low level when it is busy. The external driver ensures that this operation does not affect the actual DOUT bus line except when the slave card is selected (CS is low).

To assert busy status, a slave should bring DOUT low before the EOT byte transfer is complete. This prevents the master from initiating another bus transaction with the same slave. In general, the master should check DOUT for a slave busy indication before every bus transaction. Slaves that do not wish to assert a busy status should bring DOUT high-before the EOT byte transfer is complete.

According to one embodiment of the present invention, each slave is not required to provide any setup time for DOUT before toggling HS. The DOUT line is allowed a period of 100 µs to stabilize after the HS edge occurs. Consequently, the master should delay sampling of DOUT for at least 100 µs after the HS edge occurs. This may be accomplished by software implementations in the master, provided HS and DOUT are not sampled in the same instruction.

Figure 2:
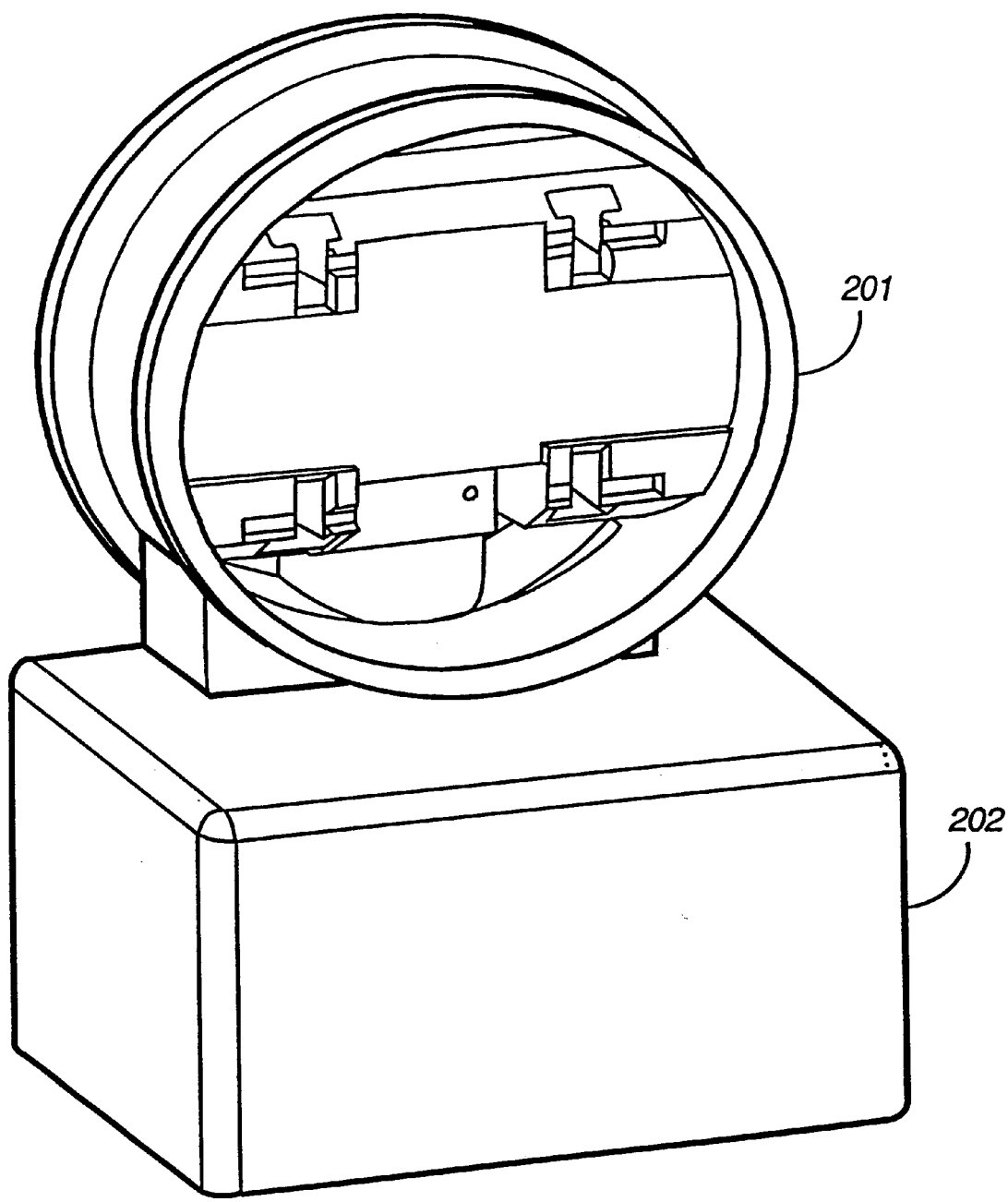
FIG. 2 shows an illustration of the external appearance of a modular meter based utility gateway enclosure for housing the gateway shown in FIG. 1.

With reference to FIG. 2, the utility gateway 100 described with reference to FIG. 1 may be implemented within the system by attaching the gateway 100 within an enclosure or electronics bay 202 which is attached to a power meter collar 201. The power meter collar 201 couples a power meter (not shown) of a residence or other building to the meter bay (not shown) of the residence or building.

Figure 3:
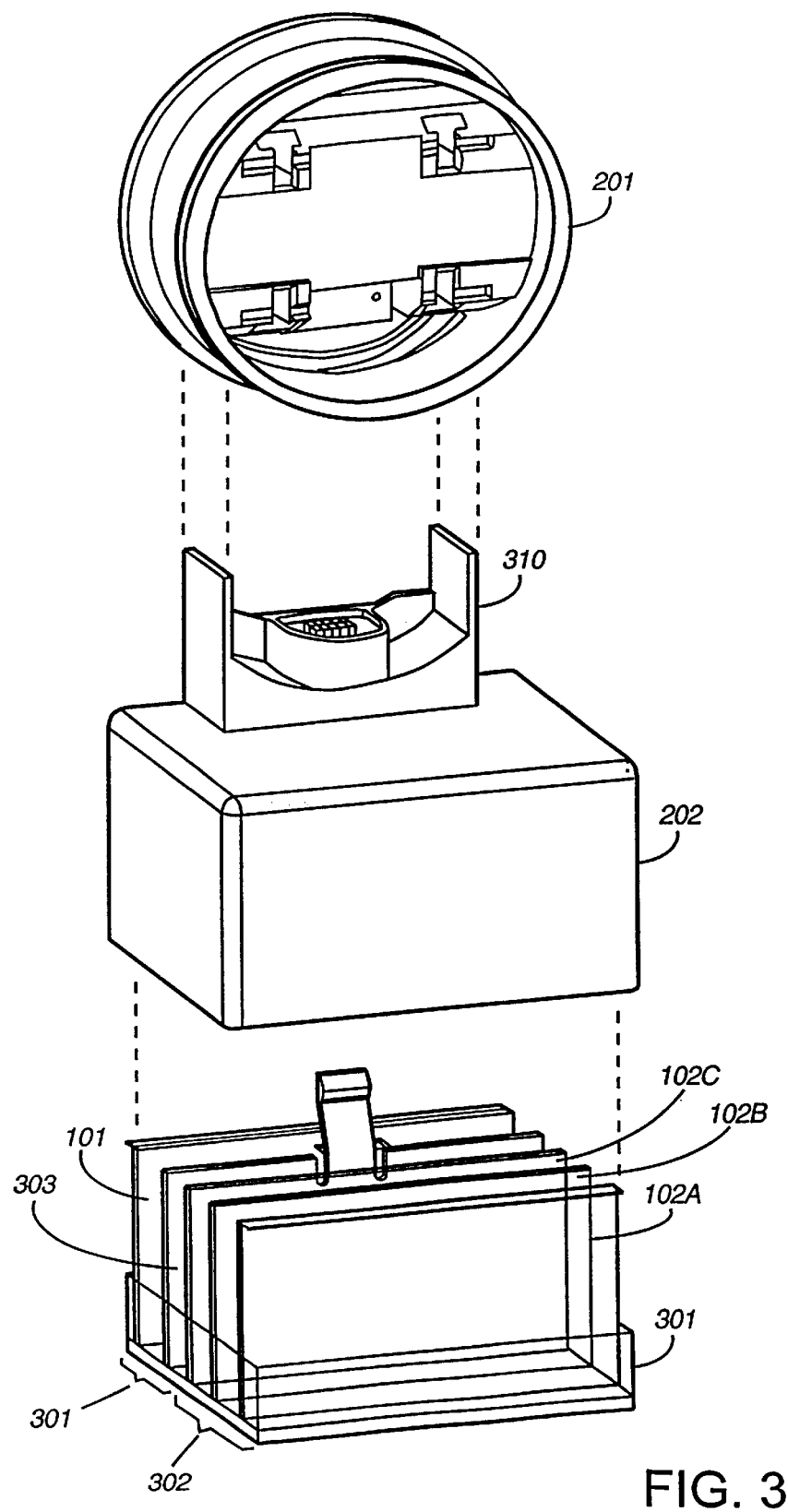
FIG. 3 provides an illustration of the arrangement of the components of the utility gateway of FIG. 1 within the modular meter based utility gateway enclosure shown in FIG. 2, including a meter socket collar, an external utility gateway enclosure or electronics bay, and an internal arrangement of the electronics bay including inserted WAN and LAN cards.

FIG. 3 provides an illustration of the positioning of the WAN card 101, LAN cards 102, and main bus 103 within the modular meter based utility gateway electronics bay 202 shown in FIG. 2. WAN card 101 is positioned within a first chamber 301 of the electronics bay 202, and LAN cards 102a, 102b, and 102c are positioned in a second chamber 302 of the electronics bay 202 to isolate the LAN cards 102a–c from radio-frequency interference caused by RF operation of the WAN card 101. A partition 303 separates the first chamber 301 from the second chamber 302.

The first and second chambers 301 and 302 may optionally be accessed by two different panels, thereby allowing for two levels of access, one for the WAN service provider and the other for the LAN service provider. As a result, the WAN service provider is only able to access the WAN card in the first chamber 301, and the LAN service provider(s) is be able to access both the first and second chambers 301 and 302.

To install the enclosure according to the present invention, the back portion of the meter collar 201 is snapped into the meter bay (not shown) of the residence or building, the meter pan lid is closed, and the power meter (not shown) is attached to the front of the meter collar 201. The electronics bay 202 is then connected to the meter collar 201 by connector 310. Connector 310 provides access from the gateway 100 to the power supply of the residence or building. According to one embodiment, the meter collar 201 may be configured to provide a power cut-off switch to cut off power to and thereby disable, the gateway 100 in electronics bay 202.

According to one embodiment of the utility gateway enclosure according to the present invention, tamper-resistant mechanisms and/or tamper detection mechanisms may be installed with the enclosure. Tamper-resistant mechanisms may be, for example, padlocks (not shown) provided on meter rings (not shown) used to hold both the enclosure and the meter in place. A tamper detection mechanism may be, e.g., a low-impedance current coil which is connected across the power meter when the gateway is plugged into the power meter. While the gateway is coupled to the power meter, the voltage drop across the power meter is relatively small as a result of the presence of the current coil. When the gateway is uncoupled from the power meter, the current coil is disconnected, resulting in a substantial increase in the voltage across the power meter. This increase in voltage may be monitored, for example, by an optocoupler which senses the voltage across the power meter and provides sensor readings to a microprocessor. In turn, the microprocessor initiates communication with a headend or other monitoring station to indicate that the gateway has been tampered with (i.e., uncoupled from the power meter). A specific embodiment of this type of tamper protection circuitry is described in the following detailed description of FIG. 7.

Figure 4:
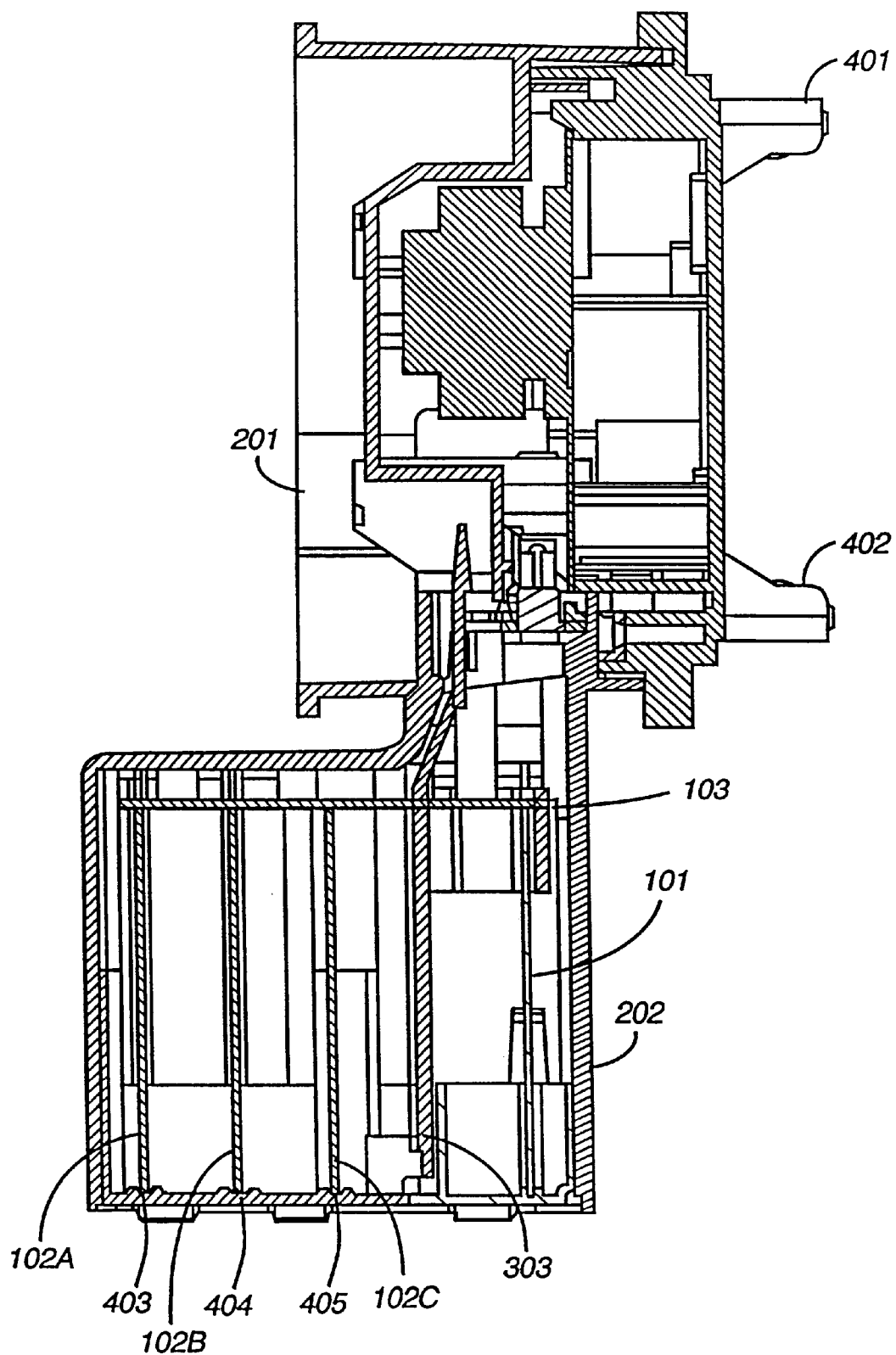
FIG. 4 depicts a side diagram of the electronics bay 202 illustrated in FIG. 3.

FIG. 4 provides a side diagram of the electronics bay 301 illustrated in FIG. 3. The meter collar 201 includes prongs 401 and 402 for insertion into the meter bay (not shown). Within the electronics bay 202, LAN cards 102a–c are positioned in three slots 403, 404, and 405 and isolated from WAN card 101 by partition 303. The main bus 103 is coupled to the LAN and WAN cards and penetrates the partition 303.

Figure 5:
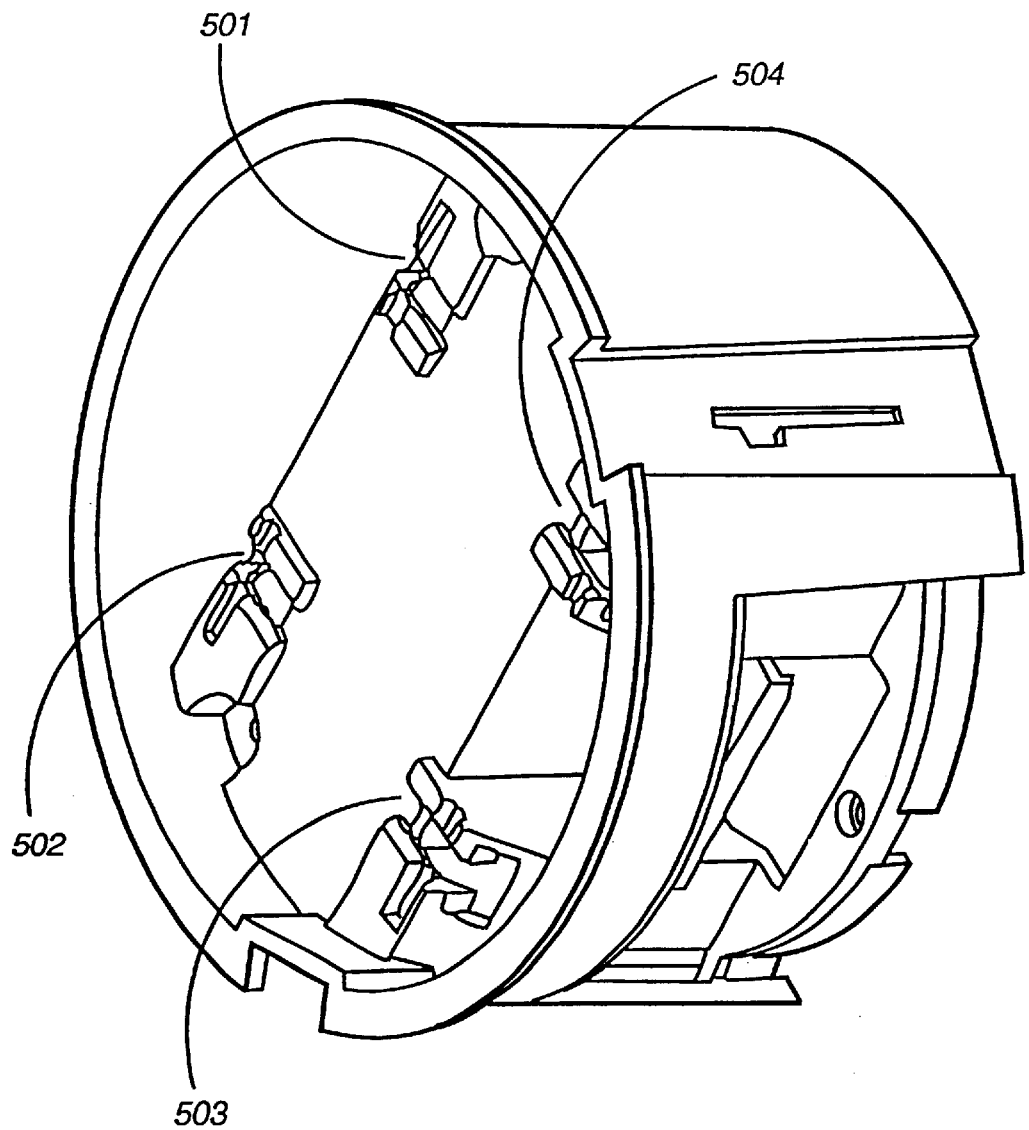
FIG. 5 illustrates the meter socket collar used to couple the utility gateway enclosure according to the present invention to a conventional power meter.

FIG. 5 provides an illustration of the collar meter socket 201 used to couple the utility gateway enclosure according to the present invention to a conventional power meter (not shown). A conventional meter is attached to prongs 501–504. The prongs 401 and 402 (see FIG. 4) on the opposite side of the collar are attached to the meter bay (not shown).

Figure 6:
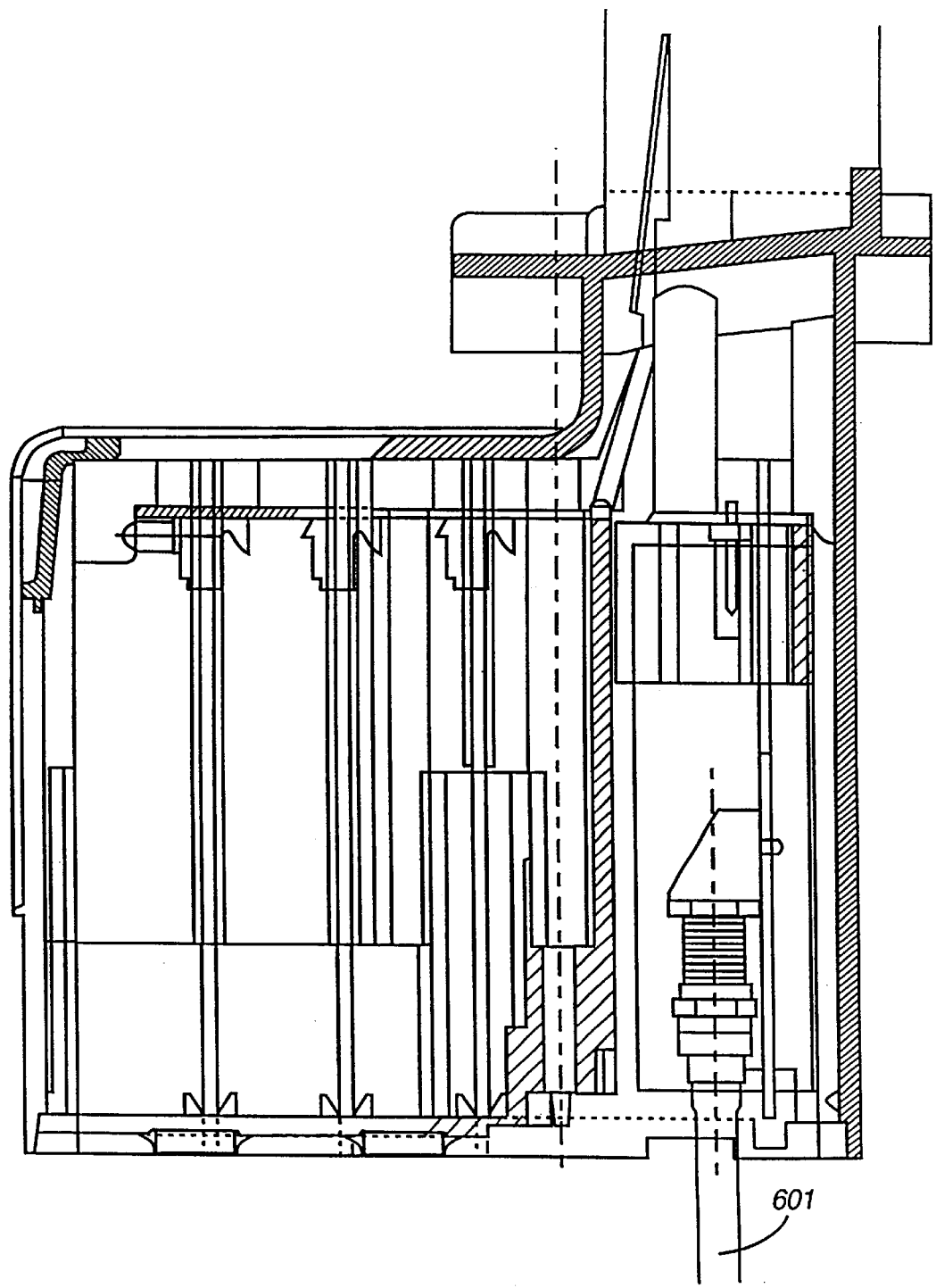
FIG. 6 depicts a side diagram of the electronics bay 202 including, a coaxial cable attachment.

FIG. 6 provides a side diagram of the electronics bay 301 including the features described above with reference to FIG. 4. A coaxial cable attachment 601 is also illustrated. This attachment provides a connection between the gateway 100 and the HFC network.

The modular meter-based utility gateway enclosure according to the present invention may be configured using, e.g., a two-way infrared (I/R) link for performing local set-up, diagnostics, and in-home device testing without opening the enclosure. Since the gateway according to the present invention is designed to operate within multiple WANs and LANs/in-home networks, installation of the gateway enclosure requires programming of the gateway to assign to the gateway the particular in-home devices (personal computers, etc.) which are to communicate through the gateway. This assignment may be performed, for example, by optically scanning the bar codes associated with each in-home device, scanning the gateway identification code, and then downloading this information to a computer via a two-way optical (I/R) link. The computer then sends programming commands to the gateway and may also initiate a communications link with a headend or other monitoring station to signal the assignment of the in-home devices to the gateway. In this way, each gateway within the system may be easily and efficiently configured.

The modular meter-based utility gateway enclosure according to the present invention is capable of supporting basic applications such as automatic meter reading, service connect and disconnect, outage detection, customer-controlled load management, and real-time pricing. In addition, the communications infrastructure allow for the addition of enhanced services, security monitoring, telephony, entertainment, and other interactive services in the future.

According to one embodiment of the present invention, the above-described features are facilitated by host applications that reside at the utility connected to a WAN via the utility gateway enclosure. The applications are tied to a network management controller that routes the downstream data flow of data and populates applications with data on request. A media access controller for scheduling and coordinating the messages on a forward and/or reverse path for any media used by the system encodes and decodes signals sent between the customer and the utility over the utility's preferred network infrastructure. The gateway also facilitates communications from the WAN to the LAN. The utility gateway supports an open architecture, such that many types of vendors may easily supply applications to operate over the network.

The function of automatic meter reading may be provided through pulse initiator meter modules, integrated into the gateway, and applications software to support the modules. Each meter module or Echelon/CEBus-compatible meter counts and delivers kilowatt-hours for single phase meters. The systems stores meter readings for at least six different levels so as to support real-time pricing. The application may read a single meter on demand from the user and respond in a short period of time such as under 60 seconds; store the meter data for a large population of meters; and provide high-speed data transfer to authorized users, both inside and outside the utility, to facilitate billing and other control functions.

The function of two-way management and real-time pricing may be provided through software applications. End-user devices, defined as a two-way load management switch or a home user interface, is located at the customer site and responds to commands generated by the two-way load management and real-time pricing application.

The function of outage notification may be provided as part of a network diagnostics program. The system supports outages detected by the network controller, for example, when a gateway fails to respond to a poll.

The remote service connect/disconnect function may be provided as part of the gateway enclosure. A contactor within the enclosure incorporates a hard-wired link to the gateway, such that only a driver circuit is required to activate and deactivate the contactor upon receipt of the appropriate command from the service reconnect system application.

Figure 7:
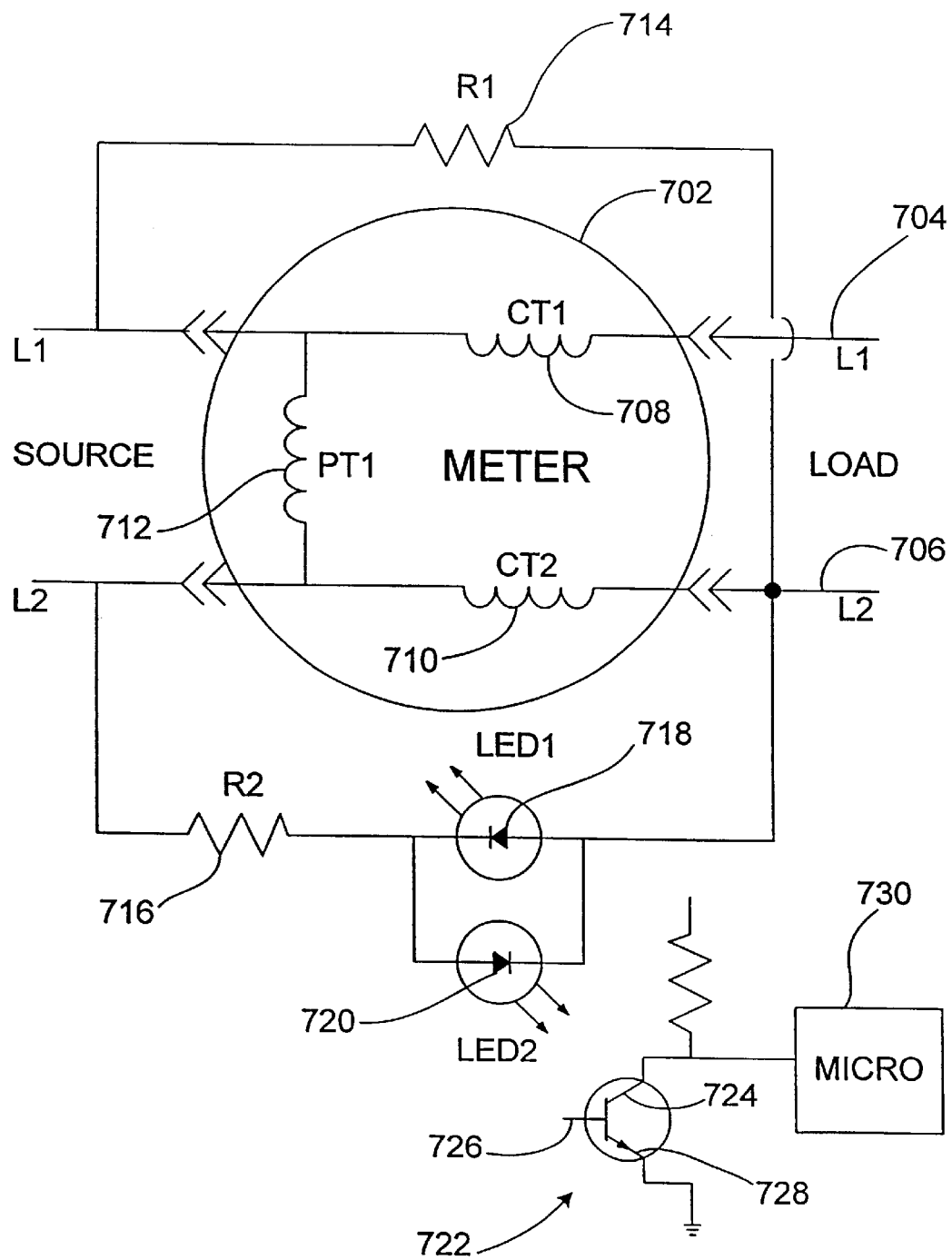
FIG. 7 illustrates a electrical schematic diagram of the electric meter tamper detection circuit.

With respect to the electrical schematic diagram of the electric meter tamper detection circuit depicted in FIG. 7, a typical, draw-out type, residential electrical kilowatt-hour meter 702 is connected in-line with two conductors 704 and 706 which provide power to the residence. Current transformers 708 and 710 monitor current flowing through conductors 704 and 706, while potential transformer 712 is connected in between and measures the potential (voltage) difference between conductors 704 and 706.

A first resistor 714 is connected to conductor 704 on the line or source side of kilowatt-hour meter 702. The load-side of the first resistor 714 is electrically connected to, the load-side of the conductor 706. Similarly, a second resistor 716 is connected to conductor 706 on the line or source side of kilowatt-hour meter 702. When the kilowatt-hour meter 702 is installed in its corresponding meter socket, virtually all of the current flows through the meter 702, because the first resistor 714 and the second resistor 716 have a very large resistance value.

Two light emitting diodes 718 and 720 are also provided. The light emitting diodes 718 and 720 are connected in parallel and oriented in opposing directions. The load side of the first resistor 714 and the load side of conductor 706 are electrically connected to the anode of diode 718 and to the cathode of diode 720. Similarly, the load side of the second resistor 716 is coupled to the cathode of diode 718 and to the anode of diode 720. Thus, light emitting diode 718 is forward-biased with respect to the current flowing from conductor 704, and reverse-biased with respect to the current flowing from conductor 706. With regard to light emitting diode 720, the diode 720 is forward-biased with respect to the current flowing from conductor 706.

A n-p-n transistor 722 has a collector 724, an emitter 726, and a base 728. The emitter 726 of the transistor 722 receives a tamper signal from the light emitting diodes 718 and 720 when the electric meter 702 is removed from its corresponding meter socket. The base 728 of the transistor 722 is coupled to an electrical ground, and the collector of 724 the transistor 722 is coupled to a microprocessor 730. In the preferred embodiment, diodes 718 and 720 as well as the n-p-n transistor 722 are provided in a standard dual diode optical isolator. The microprocessor 730 receives the tamper signal from the transistor 722 and relays the signal to the headend. In the preferred embodiment, the microprocessor 730 is a derivative of a Phillips 8051.

In summary, when the kilowatt-hour meter 702 is in place, virtually all of the current flows through the meter 702, because the resistance value for the first and second resistors is comparatively large. When the meter 702 is removed from its corresponding meter socket, the voltage potential between the source and the load side causes current to flow through the first and second resistors 714 and 716. This current lights up one or both light emitting diodes 718 and 720, thereby causing the transistor 722 to send a tamper signal to the microprocessor 730. It should be noted that this system senses meter removal regardless as to whether the home circuit breaker is in the open or closed position.

Figure 8:
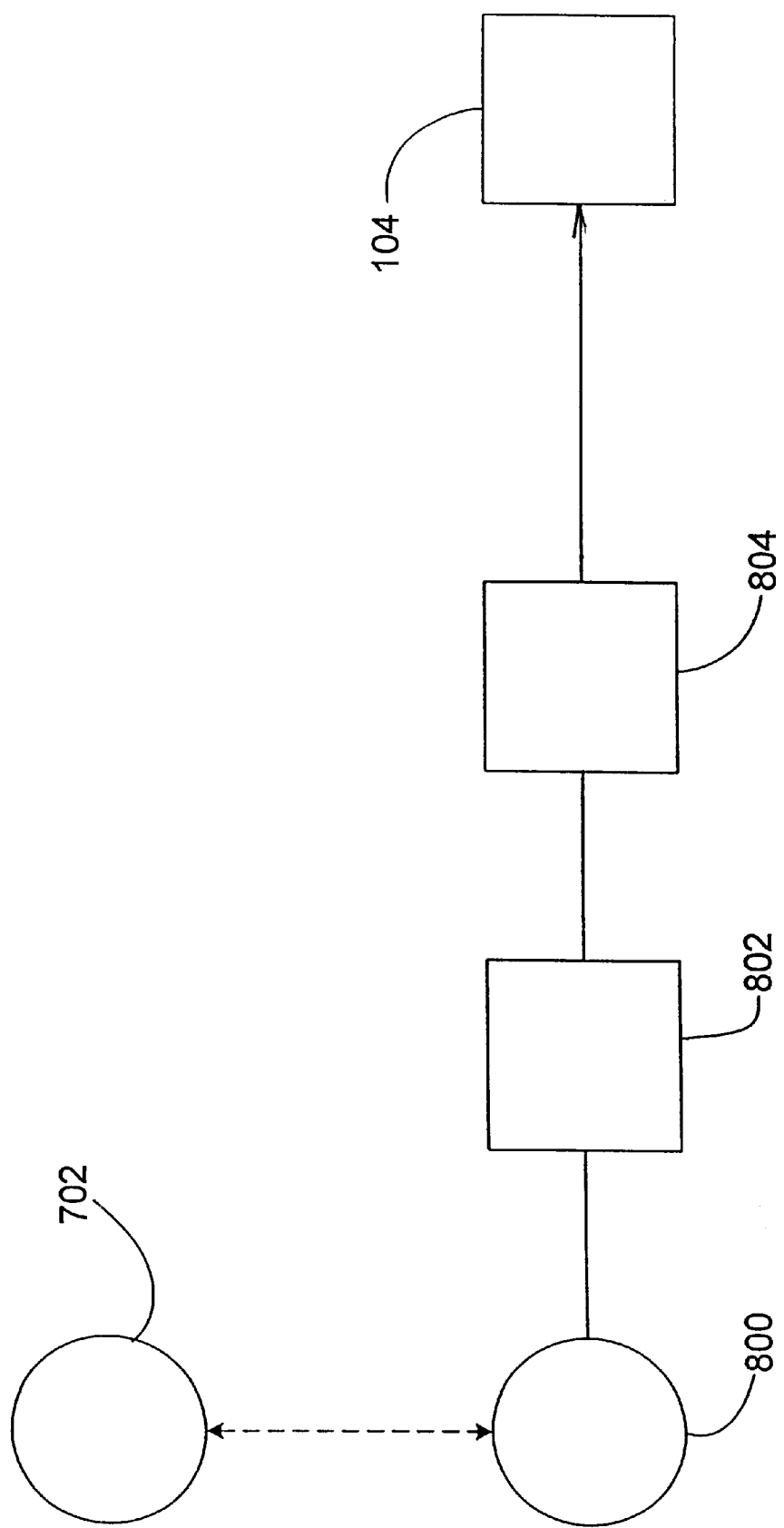
FIG. 8 shows a system overview for the electric meter tamper detection system of the present invention.

A block diagram or system overview of the electric meter tamper detection system of the present invention is depicted in FIG. 8. The electric meter 702 is securely fastened in its corresponding meter socket 800 under normal operations. When the meter 702 is removed from the socket 800, the removal is sensed by the detection system 802. The detection system 802 then generates a tamper signal which is supplied to the transfer system 804, which outputs the tamper signal to the headend 104 or any other suitable alarm signal receiver.

SCOPE

In the foregoing specification, the present invention has been described with reference to specific exemplary embodiments thereof. It will be apparent to those skilled in the art, that a person understanding this invention may conceive of changes or other embodiments or variations, which utilize the principles of this inventions without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A method of detecting tamper of an electric meter, comprising the steps of:

connecting a tamper detection sensor to a source side of the electric meter;

generating a tamper signal with the tamper detection sensor when the electric meter is removed from a corresponding socket; and notifying a headend that the electric meter has been removed upon generation of the tamper signal.

2. The method according to claim 1, wherein the step of connecting the tamper detection sensor includes the steps of coupling a resistor to a conductor and coupling a light emitting diode to the resistor and the conductor; and the step of generating the tamper signal includes the step of producing light from the light emitting diode when the electric meter is removed.

3. The method according to claim 1, wherein the step of notifying the headend includes the steps of:

receiving the tamper signal from the tamper detection sensor with a transistor; and activating a relaying means coupled to the transistor, the relaying means relaying a tamper indication signal to the headend.

4. The method according to claim 2, wherein the step of notifying the headend includes the steps of:

receiving the tamper signal from the tamper detection sensor with a transistor; and activating a relaying means connected to the transistor, the relaying means relaying a tamper indication signal to the headend.

5. The method according to claim 1, further comprising the step of electrically isolating the tamper detection sensor and a communication device, the communication device being used to notify the headend.

6. The method according to claim 1, further comprising the steps of:

connecting the electric meter in-line with a power conductor; and monitoring current flow through the power conductor with the electric meter.

7. The method according to claim 1, wherein the electric meter is connected in-line with and monitoring current flow through a first power conductor and a second power conductor, the first power conductor having a line-side and a load-side, the second power conductor having a line-side and a load-side, and the step of connecting the tamper detection sensor includes the steps of:

coupling a first resistor to the line-side of the first power conductor and to the load-side of the second power conductor;

coupling a second resistor to the line-side of the second power conductor;

coupling a first light emitting diode to the second resistor and the load-side of the second power conductor, the first light emitting diode generating a first tamper signal when the electric meter is removed; and coupling a second light emitting diode in parallel with the first light emitting diode, the second light emitting diode generating a second tamper signal when the electric meter is removed.

8. The method according to claim 7, wherein the step of notifying the headend includes the steps of:

receiving the first and second tamper signals with a transistor;

outputting an alarm from the transistor when either the first tamper signal or the second tamper signal has been generated;

receiving the alarm with a microprocessor; and establishing a communication link between the microprocessor and the headend.

9. The method according to claim 1, wherein the step of connecting the tamper detection sensor includes the steps of:

coupling a first resistor to a line-side of a first power conductor;

coupling a first light emitting diode in series with the first resistor; and coupling the first light emitting diode to a line-side of a second power conductor.

10. The method according to claim 9, wherein the step of connecting the tamper detection sensor further includes the step of coupling a second light emitting diode in parallel with the first light emitting diode, the second light emitting diode having an opposite orientation than the first light emitting diode.

11. The method according to claim 9, wherein the step of connecting the tamper detection sensor further includes the step of coupling a second resistor between the first light emitting diode and the line side of the second power conductor.

12. The method according to claim 10, wherein the step of connecting the tamper detection sensor further includes the step of coupling a second resistor between the first and second light emitting diodes and the line side of the second power conductor.

13. The method according to claim 1, wherein the step of notifying the headend includes the steps of:

configuring a data packet; and delivering the data packet to the headend over a communication network.

* * * * *